(12) United States Patent
Salters

(10) Patent No.: US 11,135,625 B2
(45) Date of Patent: Oct. 5, 2021

(54) SYSTEM FOR ANTI-BIOFOULING

(71) Applicant: KONINKLIJKE PHILIPS N.V., Eindhoven (NL)

(72) Inventor: Bart Andre Salters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 157 days.

(21) Appl. No.: 15/537,454

(22) PCT Filed: Dec. 24, 2015

(86) PCT No.: PCT/EP2015/081253
§ 371 (c)(1),
(2) Date: Jun. 19, 2017

(87) PCT Pub. No.: WO2016/107829
PCT Pub. Date: Jul. 7, 2016

(65) Prior Publication Data
US 2018/0001356 A1 Jan. 4, 2018

(30) Foreign Application Priority Data
Dec. 30, 2014 (EP) ..................... 14200557

(51) Int. Cl.
B08B 7/00 (2006.01)
B08B 17/02 (2006.01)
B63B 59/08 (2006.01)

(52) U.S. Cl.
CPC ............ *B08B 7/0057* (2013.01); *B08B 17/02* (2013.01); *B63B 59/08* (2013.01); *Y02T 70/00* (2013.01)

(58) Field of Classification Search
None
See application file for complete search history.

(56) References Cited

U.S. PATENT DOCUMENTS 3,462,597 A * 8/1969 Young ..................... C02F 1/325
250/431
4,649,849 A 3/1987 McCormick
5,322,569 A 6/1994 Titus et al.
(Continued)

FOREIGN PATENT DOCUMENTS

JP 5675290 A 6/1981
JP 2004081119 A 3/2004
(Continued)

OTHER PUBLICATIONS

EPO machine translation of JP 2004081119 (Year: 2019).*

*Primary Examiner* — Eric W Golightly

(57) ABSTRACT

The invention provides an anti-fouling lighting system (1) configured for preventing or reducing biofouling on a fouling element (1201) of an object (1200). The fouling element (1201) is during use at least partly moving and at least temporarily exposed to water. Fouling is prevented by irradiating an anti-fouling light (211) onto said fouling element (1201). The anti-fouling lighting (1) system comprises at least one laser light source (2) configured to generate the anti-fouling light (211) and to provide said anti-fouling light (211) to said fouling element (1201) during use, wherein the system (1) is arranged such that during use the fouling element (1201) at least partly moves with respect to the laser light source (2).

20 Claims, 2 Drawing Sheets

(56) References Cited

U.S. PATENT DOCUMENTS

| | | |
|---|---|---|
| 6,407,385 B1 | 6/2002 | Okada |
| 2008/0158906 A1* | 7/2008 | Park .................... G02B 5/0252 |
| | | 362/606 |
| 2008/0213129 A1 | 9/2008 | van der Pol et al. |
| 2012/0050520 A1* | 3/2012 | Thoren .................. B63B 59/08 |
| | | 348/81 |
| 2012/0218764 A1* | 8/2012 | Williamson ............ F21S 8/026 |
| | | 362/294 |
| 2014/0078584 A1* | 3/2014 | Farr ....................... B63B 59/04 |
| | | 359/507 |

FOREIGN PATENT DOCUMENTS

| | | |
|---|---|---|
| JP | 2013171534 A | 9/2013 |
| WO | 1983001400 A1 | 4/1983 |

* cited by examiner

SYSTEM FOR ANTI-BIOFOULING

CROSS-REFERENCE TO PRIOR APPLICATIONS

This application is the U.S. National Phase application under 35 U.S.C. § 371 of International Application No. PCT/EP2015/081253, filed on 24 Dec. 2015, which claims the benefit of European Patent Application No. 14200557.8, filed on 30 Dec. 2014. These applications are hereby incorporated by reference herein.

FIELD OF THE INVENTION

The invention relates to an anti-fouling lighting system and to an object, such as a vessel or other (movable) construction for use in water especially in surface water that is during use at least partly moving, comprising such anti-fouling lighting system. The invention further relates to a method of anti-fouling a fouling element (of such object). Further, the invention relates to a method of providing an anti-fouling lighting system to an object, such as a vessel.

BACKGROUND OF THE INVENTION

Anti-biofouling methods are known in the art. U.S. Pat. No. 5,322,569, for instance, describes prevention of biofouling of underwater surfaces by marine organisms by irradiating the surfaces or the adjacent water with ultraviolet light and adjusting the intensity of the ultraviolet light so as to kill or temporarily stun marine organisms to prevent their attachment to the underwater surface. Further in this document an antibiofouling system with respect to a commercial boat or pleasure craft has been disclosed. According to the disclosure a boat may be docked at a marina without use for a significant length of time, causing biofouling to develop in a region which includes the rudder and propeller, thus detracting from the performance of the boat. An antifouling system is arranged in accordance with this disclosure is installed during idle periods to bathe the rudder and propeller area with the ultraviolet radiation, thus keeping these areas free of the performance-robbing bio fouling. Preferably, the antifouling system is constructed of a plastic such as polyvinyl chloride (PVC) and contains an ultraviolet lamp.

WO83/01400 describes that non-contacting removal of undesired materials from the surfaces of objects is accomplished by directing coherent electromagnetic radiation from a laser onto the undesired material. The power density of the impingement radiation is effective to remove the undesired material without damage to the underlying object. Principles of the invention are applicable to numerous surface cleaning situations including the de-fouling of marine surfaces. For de-fouling a ship's hull, the laser radiation is conducted by mirrors and focused on the hull. Barnacles are shocked and dislodged from the hull.

JPS5675290 describes that preventive devices against organic adhesion are provided all around a hull near the waterline. Each device is provided with an ultraviolet ray reflection member of a bent plate supported by wires or vertical rods and an ultraviolet radiator like an ultraviolet lamp fixed inside the reflection member via a holding member containing electric wires together with a transparent cover to cover the ultraviolet radiator. It is also provided with a base plate in one body with the ultraviolet ray reflection member, and stuck on a shell plate of the hull via a liner of a permanent magnet, soft rubber, or the like fixed on the base plate. In this construction, the radiation of ultraviolet rays near the waterline 1 prevents the adhesion of bacterial slime on the outer surface of the hull effectively.

U.S. Pat. No. 6,407,385 describes methods and apparatus in which pulses of laser light are used to remove particles from a sample surface. The laser light can have a wavelength absorbed by water, and the sample surface can be coated with a film of water. To prevent decreasing the intensity of the laser light propagating from a source to the sample, a propagation path is provided from the source to the sample that contains an environment lacking water vapor or other gas that significantly absorbs at a wavelength similar to that at which water absorbs the laser light. The methods and apparatus can also include observing the sample in real time as the sample is being irradiated with the laser light. The methods and apparatus can also include vibrating the sample as the sample is being irradiated to facilitate removal of the particles, thereby allowing the intensity of the laser light to be decreased to levels that do not damage the sample surface.

SUMMARY OF THE INVENTION

Biofouling or biological fouling (herein also indicated as "fouling") is the accumulation of microorganisms, plants, algae, and/or animals on surfaces. The variety among bio fouling organisms is highly diverse and extends far beyond attachment of barnacles and seaweeds. According to some estimates, over 1700 species comprising over 4000 organisms are responsible for biofouling. Biofouling is divided into microfouling which includes bio film formation and bacterial adhesion, and macrofouling which is the attachment of larger organisms. Due to the distinct chemistry and biology that determine what prevents organisms from settling, these organisms are also classified as hard or soft fouling types. Calcareous (hard) fouling organisms include barnacles, encrusting bryozoans, mollusks, polychaete and other tube worms, and zebra mussels. Examples of non-calcareous (soft) fouling organisms are seaweed, hydroids, algae and bio film "slime". Together, these organisms form a fouling community.

In several circumstances bio fouling creates substantial problems. Machinery stops working, water inlets get clogged, and hulls of ships suffer from increased drag. Specifically for moving parts bio fouling effects the speed and/or the acceleration of the motion and eventually stops the said moving part. Specifically for the propellers that are used underwater significant losses in propulsive efficiency occur resulting from blade roughening due to fouling. Accordingly efforts in avoiding this phenomena are not new and the topic of anti-fouling, i.e. the process of removing or preventing fouling from forming, is well known. In industrial processes, bio-dispersants can be used to control biofouling. In less controlled environments, organisms are killed or repelled with coatings using biocides, thermal treatments or pulses of energy. Nontoxic mechanical strategies that prevent organisms from attaching include choosing a material or coating with a slippery surface, or creation of nanoscale surface topologies similar to the skin of sharks and dolphins which only offer poor anchor points.

Herewith an approach is presented based on optical methods, in particular using ultra-violet light (UV). It appears that most micro-organisms are killed, rendered inactive or unable to reproduce with 'sufficient' UV light. This effect is mainly governed by the total dose of UV light. A typical dose to kill 90% of a certain micro-organism is 10 mW-hours per square meter; details are contained in the following paragraphs regarding UV light, and the associated Figures. Prior art systems, however, may be inefficient in their use and waste a lot of radiation in the water without removing biofouling.

A laser is a device that emits light through a process of optical amplification based on the stimulated emission of electromagnetic radiation. Accordingly irradiating UV light via a laser light source provides a rather efficient and also low cost form of providing anti fouling light to a fouling surface. A laser differs from other sources of light because it emits light coherently. Spatial coherence provides a laser to be focused to a tight spot. As a result due to the spatial coherence of the laser light source it is per se not easy to distribute the antifouling effect over the whole anti fouling element.

Hence, it is an aspect of the invention to provide an alternative anti-fouling lighting system and/or a vessel, or other object, comprising such anti-fouling lighting system and/or a (movable) construction, or other object for use in water wherein the object is at least partly moving/rotating during use comprising such anti-fouling lighting system and/or an alternative method of anti-fouling an element (of such vessel or constructions, or other object, etc.), which preferably further at least partly obviate one or more of above-described drawbacks.

Therefore, in a first aspect the invention provides an object, the object comprising a fouling element, the object further comprising an anti-fouling lighting system, the anti-fouling lighting system comprising at least one laser light source wherein the laser light source is configured to irradiate with the anti-fouling light at least part of said fouling element, wherein the anti-fouling lighting system is arranged such that during use the fouling element at least partly moves with respect to the laser light source. The object especially comprises an object that during use is at least temporarily exposed to water. The fouling element especially comprises an anti fouling element that during use is at least temporarily in contact with water and during use is at least partly moving.

In a further aspect, the invention provides an anti-fouling lighting system configured for preventing or reducing bio fouling on a fouling element of an object, that during use is at least partly moving and is at least temporarily exposed to water, by irradiating an anti-fouling light to said fouling element, the anti-fouling lighting system comprising at least one laser light source configured to generate an anti-fouling light and to provide said anti-fouling light to said fouling element during use, wherein the system is arranged such that during use the fouling element at least partly moves with respect to the laser light source. Hence, the invention also provides the anti-fouling system per se. Hence, in a further aspect the invention provides an anti-fouling lighting system ("system") (especially configured for preventing or reducing (water related) bio fouling on a fouling element of an object which during use is at least partly moving and is at least temporarily exposed to water (or another liquid). The system provides an anti-fouling light ("light") to said moving fouling element. The anti-fouling lighting system comprises: a laser light source configured to generate an anti-fouling light, wherein especially the anti-fouling light comprises UV light. The laser light source is configured to provide said anti-fouling light to said fouling element during use, in other words while the fouling element is at least partly moving with respect to the laser light source.

As a synergistic effect provided by the fouling element being at least partly moving and the laser light source, an effective and efficient lighting is achieved over a larger area of the fouling element as the laser light source sweeps an area on the fouling element during its movement.

Herein, the term "fouling" or "biofouling" or "biological fouling" are interchangeably used. Above, some examples of fouling are provided. The described method (see below) and lighting system can be applied to prevent fouling on the propellers of ships, but they are applicable to all marine objects including stationary (pipes, marine stations etc.) and/or moving marine objects (submarines etc.) that comprise a fouling element that is at least partly moving during use. The disclosed anti-fouling solution may also be applied to objects operating in waterways, canals or lakes and for example also to aquariums, etc.

During use of the object, the object may move, such as moving in water (such as in the case of a vessel). When moving, the anti-fouling element and the laser light source will also move. Hence, the fouling element is at least temporarily in contact with water and is at least partly moving during use. However, the anti-fouling element also moves with respect to the laser light source (and in general essentially the remainder of the object) during use. Such movement may be a substantially permanent movement, such as in the case of a propellor, but may also be a substantially temporary movement, such as in the case of a rudder. The movement of the fouling element may be controlled by a control system. This control system may be the same or may be another than a control system configured to control the anti-fouling lighting system (see also below). The control system configured to control the movement of the fouling element and the control system for controlling the anti-fouling lighting system, more especially for controlling an intensity of the anti-fouling light, may functionally be coupled.

In an embodiment of the invention the anti-fouling system comprises a control system configured to control an intensity of the anti-fouling light as function of one or more of the speed and/or acceleration of the fouling element with respect to the object and a timer for time-based varying the intensity of the anti-fouling light. Such system allows a much more efficient removal of biofouling or prevention of biofouling on the moving surface. For instance, the intensity of the fouling light may be reduced when the fouling element is not in line with the laser light source and/or the the intensity of the fouling light may be increased when the fouling element is in line with the laser light source.

Ultraviolet (UV) is that part of electromagnetic light bounded by the lower wavelength extreme of the visible spectrum and the X-ray radiation band. The spectral range of UV light is, by definition between about 100 and 400 nm (1 nm=$10^{-9}$ m) and is invisible to human eyes. Using the CIE classification the UV spectrum is subdivided into three bands: UVA (long-wave) from 315 to 400 nm; UVB (medium-wave) from 280 to 315 nm; and UVC (short-wave) from 100 to 280 nm. In a preferred embodiment of the anti-fouling system the anti-fouling light comprises one or more of UV-A and UV-C light.

In another embodiment of the invention the anti-fouling system comprises an expander that expands the beam of anti-fouling light generated by the laser light source such that the anti-fouling light sweeps (during use) at least part of the fouling element. Accordingly the anti-fouling light is provided over even a larger area of the fouling element as not a spot but at least a line is now irradiated and the said line in a sense moves over the fouling element via the movement of the fouling element during use.

In an embodiment of the invention the anti-fouling system comprises a reflector positioned so as to reflect the antifouling light generated by the laser light source towards the opposite side of the fouling element on which said anti-fouling light is provided via the laser light source.

In a version of the above described embodiment the reflector is positioned such that the reflector has a main optical axis in a direction non-parallel to the direction of the anti-fouling light generated by the laser light source. Accordingly, a larger surface of the fouling element can be irradiated. In an embodiment, the main optical axis of the reflector and the direction of the anti-fouling light are configured in a same plane.

In an embodiment of the invention the anti-fouling system comprises a movement mechanism that moves any one of the laser light source, the expander or the reflector so that the anti-fouling light sweeps at least part of the fouling element. Hence, the movement mechanism is especially configured to move any one of the laser light source, the expander or the reflector for sweeping the anti-fouling light at least part of the fouling element. Especially, the anti-fouling system comprises a movement mechanism that moves any one of the expander or the reflector so that the anti-fouling light sweeps at least part of the fouling element.

In an embodiment of the invention the anti-fouling system comprises at least two laser light sources positioned such that the first laser light source is positioned so as to provide anti-fouling light on the front side of the fouling element whereas the second laser light source is positioned so as to provide anti-fouling light on a back side of the fouling element.

In a further aspect, the invention provides an object that during use is at least temporarily exposed to water, the object comprising a fouling element that during use is at least temporarily in contact with water and during use is at least partly moving, the object further comprising an anti-fouling lighting system in accordance with the above disclosed embodiments, wherein the laser light source is configured to irradiate with the anti-fouling light at least part of said fouling element.

The term "element" may e.g. in an embodiment refer to a plate, a stationary or movable construction comprising a movable part, the movable part comprising an element which comprises a surface. The term "element" may e.g. in an embodiment refer to a plate, such as one of the blades of the propeller. However, the term "element" may also refer to the entire propeller. A propellor is an example of an underwater element configured to move (during use).

The surface of an (element of the) object to be protected may comprise steel, but may optionally also comprise another material, such as e.g. selected from the group consisting of wood, polyester, composite, aluminum, rubber, hypalon, PVC, glass fiber, etc. In the case that the construction is movable, the construction may e.g. be a weir, a dam, a sluice, etc., which may have a movable part, such as a door or a valve, etc. Hence, especially the movable construction is an aquatic movable construction. The movable part may comprise an element, like a plate, such as a steel plate. Again, the term "element" may also refer to the entire movable part.

A preferred embodiment the fouling element is rotating during use. More specifically the fouling element is rotating around its own axis. In this embodiment the fouling element is an element such as a propeller.

In this specific embodiment the control system is configured to control an intensity of the anti-fouling light as function of one or more of (i) rotational speed of the fouling element, (ii) the length of anti-fouling light projected on the fouling element and (iii) a timer for time-based varying the intensity of the anti-fouling light. The term "length" may especially refer to the path length (the longer the path length, the more intensity may be needed, as over the path length, some intensity may be lost due to absorption and/or scattering). The length may e.g. depend upon a position of a rudder or of a propellor.

Alternatively or additionally, the control system is configured to control an intensity of the anti-fouling light as function of (UV-A and/or UV-C) light transmission of the medium, especially (sea) water, between the fouling element and the laser light source. For instance, a (light) sensor may be used configured to sense transmission (optionally via one or more of a light scattering measurement and a light transmission measurement). The sensor may provide a corresponding sensor signal, based on which the control system controls the intensity of the anti-fouling light.

In an alternative embodiment the fouling element is a flap or a rudder which is a rectangular element which rotates around an axis passing through one of its sides. A rudder is an example of an underwater element configured to move (during use). Obviously other moving structures are also possible as the fouling element.

In a further aspect, the invention provides a method of anti-fouling a fouling element of an object that is during use at least temporarily exposed to water, comprising the steps of providing an anti-fouling lighting system as defined above; generating the anti-fouling light with a laser light source; providing said anti-fouling light to said fouling element.

In a version of the above described embodiment the method further comprises one or more of the steps of;
  generating the anti-fouling light as function of one or more of (i) the speed and/or acceleration of the fouling element and (ii) a timer for time-based varying the intensity of the anti-fouling light and
  controlling the intensity of the anti-fouling light as function of one or more of (i) the speed and/or acceleration of the fouling element and (ii) the dimensions of the fouling element.

In an another aspect, the invention provides a method of providing an anti-fouling lighting system to an object, that during use is at least temporarily exposed to water, the method comprising attaching a at least one laser light source as defined above to the object, with the at least one laser light source configured to provide said anti-fouling light to a fouling element of the object wherein during use said fouling element is at least partly moving with respect to the laser light source during use.

In yet a further aspect, the invention also provides an object (such as e.g. selected from the group consisting of a vessel and a (movable) construction in water, that during use is at least temporarily exposed to water, the object) comprising a fouling element that during use is at least partly moving and is at least temporarily in contact with water, the object further comprising the lighting module as defined herein, wherein the lighting module is configured to irradiate with the anti-fouling light on least part of said fouling element.

The fouling element may be a part of an element of the object. Hence, in embodiments the object is selected from the group consisting of a vessel, a weir, a dam, a stew, a sluice, a fish farming sea cage, hydroelectric structures, and a buoy.

A system for anti-fouling of a fouling element may comprise a plurality of light sources or a combination of light sources and other components such as expanders or reflectors as disclosed herein for irradiating the fouling element so as to provide anti-fouling light over substantially the entire area of the fouling element. Accordingly the growth of micro-organisms on the fouling element is substantially reduced.

It is an advantage of the presently provided solutions that the micro-organisms are not killed after having adhered and rooted on the fouling element, as is the case for known poison dispersing coatings, but that the rooting of micro-organisms on the fouling element is prevented. It is more efficient to actively kill micro-organism right before or just after they contact the fouling element, compared to a light treatment to remove existing fouling with large micro-organism structures. The effect may be similar to the effect created by using nano-surfaces that are that smooth that micro-organism cannot adhere to it.

Because the low amount of light energy required for killing the micro-organism in the initial rooting stage, the system may be operated to continuously provide an anti-fouling light across a large surface without extreme power requirements.

Some advantages of the presently provided technology include the retention of clean surface, reduction of the cost of corrosion treatment, reduced fuel consumption for ships, reduced $CO_2$ emission, reduce the use of toxic substances in the environment, etc.

In yet a further aspect, the invention provides a method of anti-fouling a fouling element of an object that is during use at least temporarily exposed to water, the method comprising:

providing an anti-fouling lighting system as defined above, generating the anti-fouling light with a laser light source, providing said anti-fouling light to said fouling element during use while the fouling element at least partly moves with respect to the laser light source.

In also a further aspect the invention also provides a computer program product, which, when load on a processor, is configured to execute the method. In an embodiment, the computer program product can be stored on a storage medium, such as on a remote server, on a computer. Hence, the processor may be comprised by the laser light source, or by another element comprised by the anti-fouling lighting system. However, the processor may also be comprised by an external device which is configured to control the anti-fouling lighting system. Such external device may be comprised by the object, but may optionally also configured remote.

The method may be executed in dependence of a sensor signal such as defined above. Alternatively or additionally, the method may also be executed in dependence of one or more of the speed and/or acceleration of the fouling element with respect to the object and a timer for time-based varying the intensity of the anti-fouling light. Yet alternatively or additionally, the method may also be executed in dependence of one or more of (i) a rotational speed of the fouling element, (ii) a length of anti-fouling light projected on the fouling element and the axis of rotation of the fouling element and (iii) a timer for time-based varying the intensity of the anti-fouling light. Hence, the method may include controlling the intensity of the anti-fouling light in dependence of one or more of (a) a sensor signal, (b) a rotational speed of the fouling element, (c) a length of anti-fouling light projected on the fouling element and the axis of rotation of the fouling element, and (d) a timer for time-based varying the intensity of the anti-fouling light. Therefore, the computer program product may especially be configured to execute the method and to control the intensity of the anti-fouling light in dependence of one or more of the herein indicated parameters and/or elements. Hence, the control system, the computer program product and the herein described method may be configured to control an intensity of the anti-fouling light as function of herein indicated parameters and/or elements In yet a further aspect, the invention provides a method of providing an anti-fouling lighting system to an object, to an object, that during use is at least temporarily exposed to water, the method comprising attaching at least one laser light source as defined above to the object, with the at least one laser light source configured to provide said anti-fouling light to a fouling element of the object wherein during use said fouling element is at least partly moving.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species". The article "a" or "an" preceding an element does not exclude the presence of a plurality of such elements. Moreover, the terms "front" and "back" or "opposite" are used herein to describe opposing outward faces of a fouling element. Conventionally, the viewing face is deemed the front, but the viewing face may also be deemed the back, depending on orientation.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1:
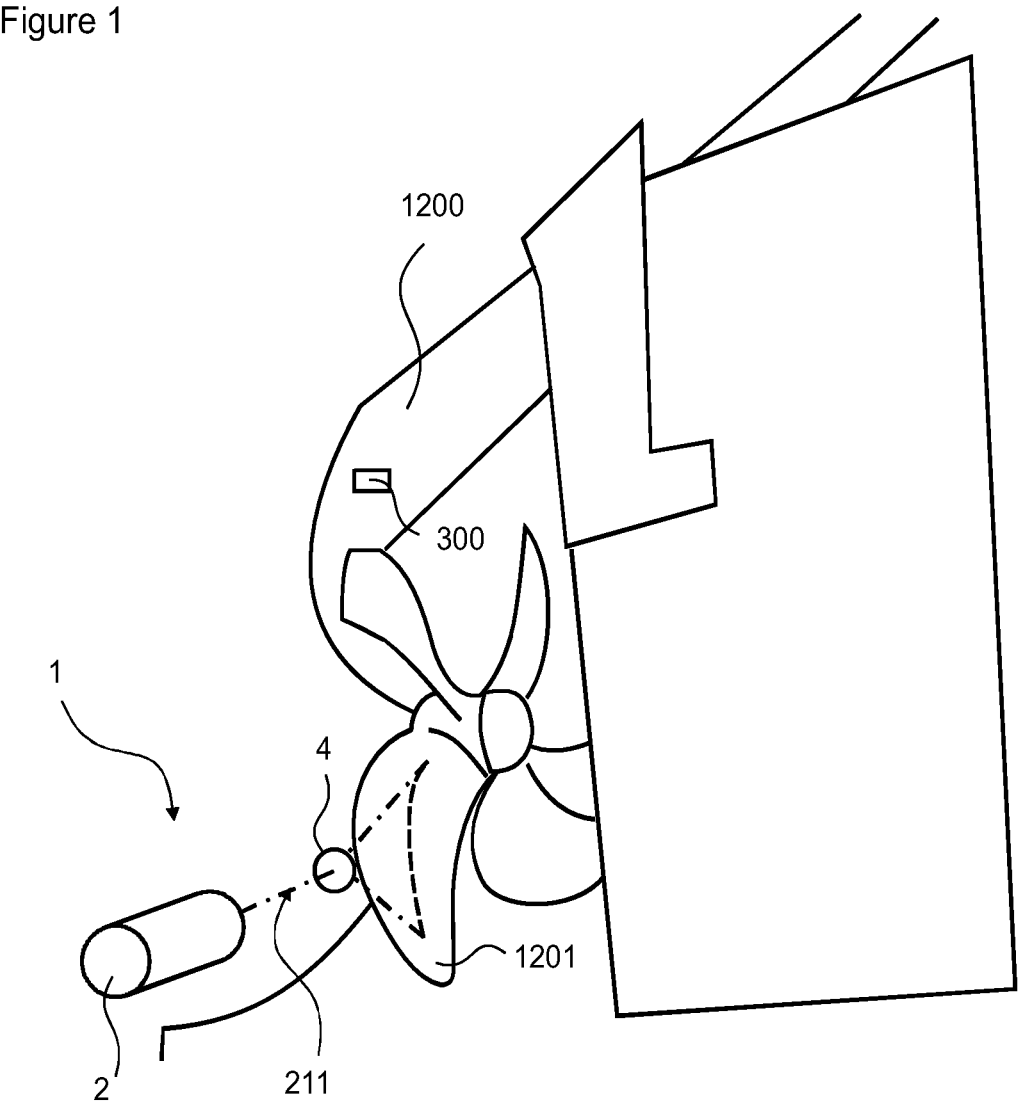
FIG. 1 is the schematic representation of an embodiment of the invention.

The drawings are not necessarily on scale.

DETAILED DESCRIPTION OF EMBODIMENTS

While the disclosure has been illustrated and described in detail in the drawings and foregoing description, such illustration and description are to be considered illustrative or exemplary and not restrictive; the disclosure is not limited to the disclosed embodiments. It is further noted that the drawings are schematic, not necessarily to scale and that details that are not required for understanding the present invention may have been omitted.

FIG. 1 shows as a basic embodiment, a schematic view of an anti-fouling lighting system (1) configured for preventing or reducing bio fouling on a fouling element (1201) of an object (1200). The fouling element (1201) is during use at least partly moving and at least temporarily exposed to water. The fouling on the fouling element (1201) is prevented or reduced by irradiating an anti-fouling light (211) onto said fouling element (1201). The anti-fouling lighting (1) system comprises at least one laser light source (2) configured to generate the anti-fouling light (211) and to provide said anti-fouling light (211) to said fouling element (1201) during use, wherein the system (1) is arranged such that during use the fouling element (1201) at least partly moves with respect to the laser light source (2). In accordance with the embodiment illustrated in FIG. 1 is the object (1200) comprises a fouling element (1201) that is rotating during use, i.e. is a propeller. In this embodiment the anti-fouling light (211) comprises one or more of UV-A and UV-C light.

In the embodiment of the present invention as illustrated in FIG. 1 the anti-fouling system (1) comprises a control system (300). The control system (300) is configured to control an intensity of the anti-fouling light (211) as function of either (i) the speed and/or acceleration of the fouling element (1201) with respect to the object (1200) or (ii) a timer for time-based varying the intensity of the anti-fouling light (211) or alternatively a combination of both. Accordingly more effective anti-fouling is achieved.

In the embodiment of the present invention as illustrated in FIG. 1 the anti-fouling lighting system (1) comprises an expander (4) that expands the beam of anti-fouling light (211) generated by the laser light source (2) such that the anti-fouling light (211) sweeps at least part of the fouling element (1201). In various embodiments different expanders (4) can be used to expand the laser beam including but not limited to a holographic diffuser.

Figure 2:
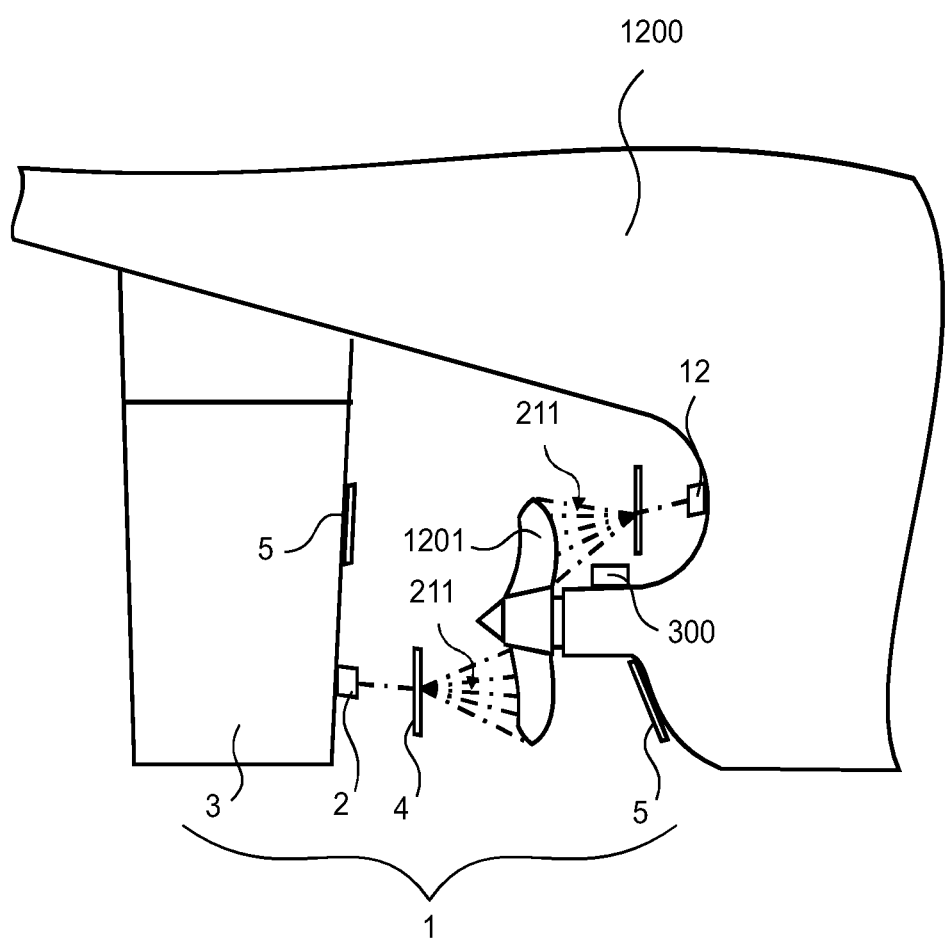
FIG. 2 is the schematic representation of another embodiment of the invention.

FIG. 2 shows a further embodiment, a schematic view of an anti-fouling lighting system (1) comprising a reflector (5) positioned so as to reflect the anti-fouling light (211) generated by the laser light source (2) towards the opposite side of the fouling element (1201) on which said anti-fouling light (211) is provided via the laser light source (2). In this specific embodiment the reflector (5) is positioned such that the reflector (5) has a main optical axis in a direction non-parallel to the direction of the anti-fouling light (211) generated by the laser light source (2).

In the embodiment of the present invention as illustrated in FIG. 2 the anti-fouling lighting system (1) comprises a movement mechanism (3) that moves the laser light source (2) and the reflector (5) so that the anti-fouling light (211) sweeps at least part of the fouling element (1201). In alternative embodiments the movement mechanism (3) can move either of the laser light source (2), the reflector (5) or the expander (4) or a combination of this three. In the embodiment illustrated the object (1200) is a marine vessel and the movement mechanism (3) is the rudder of the object (1200). In alternative embodiments the movement mechanism (3) can be an existing moving structure available on the object (1200) as in this case or it can be specific mechanism dedicated for this purpose.

In the embodiment illustrated in FIG. 2 the anti-fouling lighting system (1) comprises a further laser light source (12) positioned such that the first laser light source (2) is provides anti-fouling light (211) on a front side of the fouling element (1201) whereas the second laser light source (12) provides anti-fouling light (211) on a back side of the fouling element (1201).

The concepts are not restricted to the above described embodiments which can be varied in a number of ways within the scope of the claims. For instance, using light, in particular UV light as an anti-bio fouling means can provide an interesting opportunity in other fields. It is unique in the sense that continuous "24/7" 'protection' can be provided, over a large area. The application is especially interesting for the propellers of ships, but can also be applied in swimming pools, water treatment plants, etc. Instead of water, biofouling may occur and be treated in other liquid environments, e.g. oils, brines and/or liquids in other environments including food industry. Hence, the invention is especially explained in relation to water, such as seawater. However, the invention is not limited to such applications only. Hence, in embodiments, the term "water" may be replaced by liquid. Especially, such liquid may also include biofouling species and nutrients for such biofouling species.

Elements and aspects discussed for or in relation with a particular embodiment may be suitably combined with elements and aspects of other embodiments, unless explicitly stated otherwise.

Hence, anti-fouling solutions that release certain chemicals or biocides currently have a large market share. To be effective, these coatings have to provide an environment which is harsh for living creatures. A drawback is that over time either by intended release, or by the inevitable cleaning of the surface those chemicals are released into the water. These chemicals quite often remain active, causing adverse effects on the environment. A fundamentally different way of preventing bio-fouling is by using UV light emission. UV light is known to be effective in de-activating or even killing micro-organisms, provided a sufficient dose of a suitable wavelength is applied.

The invention claimed is:

1. An object that during use is at least temporarily exposed to water, the object comprising:
   a fouling element that during use is at least temporarily in contact with the water,; and
   an anti-fouling system comprising at least one laser light source, wherein the at least one laser light source is configured to irradiate with anti-fouling light, which is ultraviolet (UV) light, at part of the fouling element through water between the at least one laser light source and the fouling element, and wherein the fouling element is arranged such that during use the fouling element at least partly moves with respet to the at least one laser light source.

2. The object of claim 1, further comprising a control system configured to control an intensity of the anti-fouling light as a function of speed and/or acceleration of a movement of the fouling element with respect to the at least one laser light source.

3. The object according to claim 1, wherein the anti-fouling light comprises one or more of UV-A and UV-C light.

4. An object that during use is at least temporarily exposed to water, the object comprising:
  a fouling element that during use is at least temprarily in contact with water;
  an anti-fouling lighting system comprising at least one laser light source, wherein the at least one laser light source is configured to irradiate with anti-fouling light, which is ultraviolet (UV) light, at least part of the fouling element, and wherein the fouling element is arranged such that during use the fouling element at least partly moves with respect to the laser light source; and
  an expander that expands a beam of anti-fouling light generated by the at least one laser light source such that the anti-fouling light sweeps at least part of the fouling element.

5. The object of claim 4, wherein the beam expander is a holographic diffuser.

6. The object according to claim 4, further comprising a reflector positioned so as to reflect the anti-fouling light generated by the at least one laser light source towards an opposite side of the fouling element on which the anti-fouling light is provided.

7. The object according to claim 6, wherein the reflector is positioned such that the reflector has a main optical axis in a direction non-parallel to a direction of the anti-fouling light generated by the at least one laser light source.

8. The object according to claim 6, further comprising a movement mechanism that moves at least one of the at least one laser light source, the expander or the reflector so that the anti-fouling light sweeps at least part of the fouling element.

9. The object according ot claim 1, wherein the anti-fouling lighting system comprises a first laser light source and a second laser light source positioned such that the first laser light source provides anti-fouling light on a front side of the fouling element and the second laser light source provides anti-fouling light on a back side of the fouling element.

10. The object of claim 1, wherein the object is a ship, and the fouling element comprises at least one of a rudder or a propeller.

11. An object that during use is at least temporarily exposed to water, the object comprising:
  a fouling element that during use is at least temporarily in contact with water; and
  an anti-fouling lighting system comprising at least one laser light source, wherein the at least one laser light source is configured to irradiate with anti-fouling light, which is ultraviolet (UV) light, at least part of the fouling element to de-foul the fouling element, and wherein the fouling element is configured to rotate during use of the fouling element.

12. The object according to claim 1, further comprising a control system configured to control an intensity of the anti-fouling light as a function of a rotational speed of the fouling element.

13. The object according to claim 1, further comprising a control system configured to control an intensity of the anti-fouling light as a function of a length of anti-fouling light projected on the fouling element.

14. The object according to claim 1, further comprising a control system configured to control an intensity of the anti-fouling light as a function of a signal of a sensor for sensing light transmission in the water between the fouling element and the at least one laser light source.

15. The object according to claim 11, further comprising a control system configured to control an intensity of the anti-fouling light as a function of a rotational speed of the fouling element.

16. The object according to claim 11, further comprising a control system configured to control an intensity of the anti-fouling light as a function of a length of anti-fouling light projected on the fouling element.

17. The object according to claim 11, further comprising a control system configured to control an intensity of the anti-fouling light as a function of a value of a timer for time-based varying the intensity of the anti-fouling light.

18. The object according to claim 11, further comprising a reflector positioned so as to reflect the anti-fouling light generated by the at least one laser light source towards an opposite side of the fouling element on which the anti-fouling light is provided.

19. The object according to claim 18, wherein the reflector is positioned such that the reflector has a main optical axis in a direction non-parallel to a direction of the anti-fouling light generated by the laser light source.

20. The object according to claim 18, further comprising a movement mechanism that moves at least one of the at least one laser light source or the reflector so that the anti-fouling light sweeps at least part of the fouling element.

* * * * *